UNITED STATES PATENT OFFICE.

HERMANN GEORGES CHRISTIAN THOFEHRN, OF PARIS, FRANCE.

TREATMENT OF MATTES AND RAW METALS.

SPECIFICATION forming part of Letters Patent No. 725,297, dated April 14, 1903.

Application filed December 17, 1902. Serial No. 135,608. (No specimens.)

*To all whom it may concern:*

Be it known that I, HERMANN GEORGES CHRISTIAN THOFEHRN, civil engineer, a citizen of the United States of America, and a resident of No. 350 Rue St. Honoré, Paris, in the Republic of France, have invented certain new and useful Improvements in the Treatment of Mattes and Raw Metals in Metallurgical Hearth-Furnaces, of which the following is a specification.

The object of my invention is an improved treatment of mattes and raw metals in metallurgic hearth-furnaces, reverberatory furnaces, Siemens or Martin gas-furnaces, and the like, consisting in blowing onto the surface of the metallic bath by means of blast-pipes distributed around the furnace a mixture composed of a fluid oxidizing agent under pressure and consisting of steam and air, a solid oxidizing agent formed by oxids of the metals to be treated previously brought to a suitable state of division, a metallurgic flux for forming scoria or volatile products with the metals to be eliminated and which is also brought to a state of suitable division, and hydrocarbons for increasing the heat in the zone of reaction. This treatment allows of converting copper mattes into metallic copper, refining new copper, converting nickel mattes into metallic nickel, converting tin or lead mattes into metallic tin or lead, and of converting cast-iron into steel or puddling-iron. The oxidizing action of the jet is very powerful, owing to the mixture of fluid oxidizing agent (steam and air) and the solid oxidizing agent, (oxids of the metals to be treated suitably pulverized.) These oxids can be extracted from the minerals themselves or can be obtained from oxidized mattes or by the direct oxidation of the metals. In all cases they are brought to a suitable state of division before being used. As soon as the jet comes in contact with the bath it produces energetic and rapid oxidation of the substances to be eliminated, which oxidation is aided by the high temperature produced by the hydrocarbons and immediately in the same zone of reaction. The flux simultaneously blown into the jet acts with the aid of the high temperature on the substances which have been oxidized and produces scoria, which floats and can be removed at will. Thus all impurities are progressively eliminated and the metallic bath remains with the desired degree of purity.

Having now described my invention, what I claim as new, and desire to secure by Letters Patent, is—

An improved treatment of mattes and raw metals such as copper mattes, raw copper, nickel mattes, tin or lead mattes, cast-iron, with the view of obtaining metallic copper, nickel, tin, lead, steel or puddling-iron, consisting in blowing in a hearth-furnace onto the surface of a metallic bath formed of mattes or raw metals and by means of blast-pipes distributed around the furnace, a mixture composed of a fluid oxidizing agent formed of steam and air, a solid oxidizing agent formed by oxids of the metals to be treated previously brought to a state of grains, a metallurgic flux previously reduced into grains, and hydrocarbons, substantially as and for the purpose set forth.

In witness whereof I have hereunto set my hand in presence of two witnesses.

HERMANN GEORGES CHRISTIAN THOFEHRN.

Witnesses:
 LOUIS MOSÈ,
 EDWARD P. MACLEAN.